(12) United States Patent
Bakopoulos et al.

(10) Patent No.: US 12,176,945 B2
(45) Date of Patent: Dec. 24, 2024

(54) TRANSCEIVER MODULE

(71) Applicant: Mellanox Technologies, Ltd., Yokneam (IL)

(72) Inventors: Paraskevas Bakopoulos, Ilion (GR); Ioannis (Giannis) Patronas, Piraeus (GR); Nikolaos Argyris, Zografou (GR); Dimitrios Syrivelis, Volos (GR); Elad Mentovich, Tel Aviv (IL); Dimitrios Kalavrouziotis, Papagou (GR); Avraham Ganor, Shaom (IL); Nimer Hazin, Ba'ne (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 17/869,997

(22) Filed: Jul. 21, 2022

(65) Prior Publication Data

US 2023/0412265 A1 Dec. 21, 2023

(30) Foreign Application Priority Data

Jun. 14, 2022 (GR) .............................. 20220100490

(51) Int. Cl.
*H04B 10/00* (2013.01)
*H04B 10/038* (2013.01)
*H04B 10/112* (2013.01)
*H04B 10/40* (2013.01)

(52) U.S. Cl.
CPC ....... *H04B 10/038* (2013.01); *H04B 10/1127* (2013.01); *H04B 10/40* (2013.01)

(58) Field of Classification Search
CPC ... H04B 10/038; H04B 10/1127; H04B 10/40
See application file for complete search history.

(56) References Cited

U.S. PATENT DOCUMENTS

| | | | | |
|---|---|---|---|---|
| 5,241,610 A | * | 8/1993 | Labiche | H04Q 11/0005 398/67 |
| 5,568,575 A | * | 10/1996 | Sato | G02B 6/4249 385/20 |
| 6,396,969 B1 | * | 5/2002 | Sparks | H04Q 11/0005 385/20 |
| 6,477,291 B1 | * | 11/2002 | Ramadas | H04Q 11/0062 398/43 |

(Continued)

*Primary Examiner* — Agustin Bello
(74) *Attorney, Agent, or Firm* — Anup Lyer; Moore & Van Allen PLLC

(57) ABSTRACT

A transceiver module for providing operational resilience is presented. The transceiver module is configured to receive first data via a first optical module in a first configuration of operation and detect, using an adapter that is operationally connected to the first optical module, an operational failure of the first optical module. In response to detecting the operational failure, the transceiver module is configured to switch, via the adapter, from the first configuration of operation to a second configuration of operation by: automatically engaging a second optical module; triggering the first data that was initially directed into a first input port of the first optical module to be directed into a second input port of the second optical module; and receiving the first data from a second output port of the second optical module.

22 Claims, 8 Drawing Sheets

(56) References Cited

U.S. PATENT DOCUMENTS

| | | | | |
|---|---|---|---|---|
| 6,836,353 B1* | 12/2004 | Ramadas | H04J 14/0241 | 385/24 |
| 7,471,897 B1* | 12/2008 | Theodoras, II | H04B 10/035 | 398/22 |
| 8,018,349 B1* | 9/2011 | Getker | H04L 12/413 | 714/14 |
| 8,121,478 B2* | 2/2012 | Kash | H04Q 11/0005 | 398/56 |
| 8,611,740 B2* | 12/2013 | Grossman | H04Q 11/0067 | 398/19 |
| 8,615,169 B2* | 12/2013 | Mie | H04L 12/413 | 398/71 |
| 9,118,411 B1* | 8/2015 | Schmidt | H04B 10/035 | |
| 9,209,901 B2* | 12/2015 | Dahlfort | H04B 10/40 | |
| 9,350,445 B1* | 5/2016 | Schmidt | H04B 10/032 | |
| 9,351,055 B2* | 5/2016 | Levy | H04Q 11/0005 | |
| 9,628,190 B2* | 4/2017 | Urino | H04B 10/50 | |
| 9,692,511 B1* | 6/2017 | Webman | H04B 10/0795 | |
| 9,810,848 B2* | 11/2017 | Pescod | H04J 14/0254 | |
| 9,810,849 B2* | 11/2017 | Pescod | H04J 14/02 | |
| 9,960,840 B2* | 5/2018 | Cloonan | H04J 14/0297 | |
| 10,230,473 B2* | 3/2019 | Shin | H04J 14/02 | |
| 10,374,699 B2* | 8/2019 | Ji | H04Q 11/00 | |
| 10,404,035 B2* | 9/2019 | Schrans | H01S 5/4025 | |
| 10,725,240 B2* | 7/2020 | Bovington | G02B 6/122 | |
| 10,784,956 B2* | 9/2020 | Flens | H04B 10/032 | |
| 10,866,364 B1* | 12/2020 | Jones | G02B 6/3542 | |
| 10,979,139 B1* | 4/2021 | Ibach | H04B 10/032 | |
| 11,178,473 B1* | 11/2021 | Nagarajan | H04B 10/40 | |
| 11,632,170 B2* | 4/2023 | Kovsh | H04B 10/0779 | 398/1 |
| 2001/0048793 A1* | 12/2001 | Dair | G02B 6/4277 | 385/88 |
| 2003/0011851 A1* | 1/2003 | Trezza | H01S 5/423 | 398/141 |
| 2003/0039007 A1* | 2/2003 | Ramadas | H04L 49/552 | 398/48 |
| 2004/0161232 A1* | 8/2004 | Kerfoot, III | H04J 14/0294 | 398/5 |
| 2005/0180749 A1* | 8/2005 | Koley | H04J 14/0246 | 398/45 |
| 2005/0226571 A1* | 10/2005 | Malagrino, Jr. | G02B 6/428 | 385/92 |
| 2006/0104646 A1* | 5/2006 | Schrodinger | H04B 10/43 | 398/192 |
| 2006/0159387 A1* | 7/2006 | Handelman | G02B 6/43 | 385/14 |
| 2006/0165412 A1* | 7/2006 | Jung | H04J 14/025 | 398/71 |
| 2007/0058973 A1* | 3/2007 | Tanaka | H04B 10/032 | 398/1 |
| 2009/0060522 A1* | 3/2009 | Aronson | H04B 10/032 | 398/141 |
| 2010/0098373 A1* | 4/2010 | Hochberg | G02F 1/225 | 385/2 |
| 2010/0098407 A1* | 4/2010 | Goswami | H04B 10/272 | 398/1 |
| 2011/0170856 A1* | 7/2011 | Kannari | H04B 10/503 | 398/2 |
| 2011/0262146 A1* | 10/2011 | Khemakhem | G02B 6/4457 | 398/117 |
| 2013/0046916 A1* | 2/2013 | Dudemaine | H04N 7/22 | 710/317 |
| 2013/0156417 A1* | 6/2013 | Chou | H04B 10/40 | 398/5 |
| 2013/0308951 A1* | 11/2013 | Blumenthal | H04B 10/506 | 398/83 |
| 2014/0049931 A1* | 2/2014 | Wellbrock | H04Q 1/155 | 361/788 |
| 2014/0064721 A1* | 3/2014 | Wang | H04B 10/038 | 398/139 |
| 2014/0140689 A1* | 5/2014 | Dahlfort | H04B 10/40 | 398/2 |
| 2014/0334812 A1* | 11/2014 | Noguchi | H04J 14/0221 | 398/22 |
| 2015/0003823 A1* | 1/2015 | Kawanishi | G02B 6/4286 | 398/17 |
| 2015/0050015 A1* | 2/2015 | Levy | H04Q 11/0005 | 398/116 |
| 2015/0155945 A1* | 6/2015 | Urino | H04B 10/032 | 398/183 |
| 2015/0253509 A1* | 9/2015 | Pescod | H04B 10/032 | 398/45 |
| 2015/0292938 A1* | 10/2015 | Guimond | G01J 1/4257 | 250/214.1 |
| 2016/0285557 A1* | 9/2016 | Flens | H04J 14/0297 | |
| 2017/0012708 A1* | 1/2017 | Saathoff | H04B 10/615 | |
| 2017/0111716 A1* | 4/2017 | Wellbrock | H04J 14/029 | |
| 2017/0366272 A1* | 12/2017 | Shin | H04J 14/02 | |
| 2018/0006727 A1* | 1/2018 | Young | H04B 10/503 | |
| 2018/0034542 A1* | 2/2018 | Fung | H04B 10/075 | |
| 2018/0152236 A1* | 5/2018 | Maniloff | H04B 10/40 | |
| 2018/0254844 A1* | 9/2018 | Chretien | G02B 6/10 | |
| 2018/0261983 A1* | 9/2018 | Bovington | H01S 5/5027 | |
| 2018/0294621 A1* | 10/2018 | Schrans | H04B 10/506 | |
| 2019/0089467 A1* | 3/2019 | Goergen | H04L 12/12 | |
| 2019/0312636 A1* | 10/2019 | Flens | G02B 6/4286 | |
| 2019/0312645 A1* | 10/2019 | Ishii | H04B 10/40 | |
| 2020/0003978 A1* | 1/2020 | Kewitsch | G02B 6/255 | |
| 2020/0041725 A1* | 2/2020 | Kewitsch | G02B 6/28 | |
| 2020/0088940 A1* | 3/2020 | Bovington | G02B 6/12004 | |
| 2020/0183104 A1* | 6/2020 | Truong | G02B 6/4284 | |
| 2020/0371295 A1* | 11/2020 | Jones | G02B 6/355 | |
| 2021/0033795 A1* | 2/2021 | Lohmann | H04B 10/27 | |
| 2022/0095435 A1* | 3/2022 | Xu | H04B 10/032 | |
| 2022/0337321 A1* | 10/2022 | Argyris | H04B 10/50572 | |
| 2022/0413216 A1* | 12/2022 | Hosseini | G02B 6/43 | |
| 2023/0412265 A1* | 12/2023 | Bakopoulos | H04B 10/1127 | |

* cited by examiner

TRANSCEIVER MODULE

CROSS-REFERENCE TO RELATED APPLICATIONS

This application claims priority to Greek Patent Application No. 2022/010,0490, filed Jun. 14, 2022, the entire contents of which application are hereby incorporated herein by reference.

FIELD OF THE INVENTION

The present invention relates generally to data communications, and specifically to optical modules and their application in data communications.

BACKGROUND

Optical modules are widely used in application scenarios such as data centers, base stations, Local Area Networks (LAN), backbone networks, and/or the like. As accessory products, optical modules may fail during use, causing reduced performance or unplanned downtime at the data center and resulting in significant cost to the user.

Therefore, there is a need for a transceiver module that is capable of providing continued performance in spite of operational failure.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a transceiver module is presented. The transceiver module comprises a first optical module comprising a first input port and a first output port; a second optical module comprising a second input port and a second output port; and an adapter operatively coupled to the first optical module and the second optical module. In a first configuration, the first optical module is operationally active and the second optical module is operationally inactive, and, in a second configuration, the second optical module is operationally active. The adapter is configured to switch from the first configuration to the second configuration in response to detecting an operational failure of the first optical module.

In some embodiments, the adapter comprises a first optical switch operatively coupled to the first optical module and the second optical module. A first prong of the first optical switch may be operatively coupled to an optical connection for data transmission in the first input port and a second prong of the first optical switch may be operatively coupled to an optical connection for data transmission in the second input port. The adapter may further comprise a second optical switch operatively coupled to the first optical module and the second optical module. A first prong of the second optical switch may be operatively coupled to an optical connection for data reception in the second input port and a second prong of the second optical switch may be operatively coupled to an optical connection for data reception in the first input port.

In some embodiments, the adapter may comprise a third input port operatively coupled to the first optical switch and the second optical switch, wherein a third prong of the first optical switch is operatively coupled to an optical connection for data transmission in the third input port and a third prong of the second optical switch is operatively coupled to an optical connection for data reception in the third input port. The adapter may further comprise a third output port operatively coupled to the third input port.

In some embodiments, the third output port is operatively coupled to a leaf switch.

In some embodiments, the adapter further comprises a first inline optical power monitor configured to measure instantaneous power of optical signals received from the first input port of the first optical module; and a second inline optical power monitor configured to measure instantaneous power of optical signals received from the second input port of the second optical module.

In some embodiments, the adapter is further configured to detect, using the first inline optical power monitor, the operational failure of the first optical module. In response to detecting the operational failure of the first optical module, the adapter may be configured to switch from the first configuration to the second configuration by triggering the second optical module to be operationally active; triggering data that was initially directed into the first input port of the first optical module to be directed into the second input port of the second optical module; and receiving the data from the second output port of the second optical module.

In some embodiments, the first input port of the first optical module and the second input port of the second optical module are operatively coupled to a dual-port Network Interface Controller (NIC).

In some embodiments, the transceiver module further comprises a housing at least partially encapsulating the first optical module, the second optical module, and the adapter.

In another aspect, a transceiver module is presented. The transceiver module comprises a first optical module comprising a first input port and a first output port; a second optical module comprising a second input port and a second output port; and an adapter operatively coupled to the first optical module and the second optical module. In a first configuration, the adapter is configured to receive first data from the first optical module and second data from the second optical module, and, in a second configuration, the adapter is configured to receive the first data from the second optical module. The adapter is configured to switch from the first configuration to the second configuration in response to detecting an operational failure of the first optical module.

In some embodiments, the adapter may comprise a first optical switch operatively coupled to the first optical module and the second optical module. A first prong of the first optical switch may be operatively coupled to an optical connection for data transmission in the first input port and a second prong of the first optical switch may be operatively coupled to an optical connection for data transmission in the second input port. The adapter may comprise a second optical switch operatively coupled to the first optical module and the second optical module, wherein a first prong of the second optical switch is operatively coupled to an optical connection for data reception in the second input port and a second prong of the second optical switch is operatively coupled to an optical connection for data reception in the first input port.

In some embodiments, the adapter may comprise a third input port operatively coupled to the first optical switch and the second optical switch, wherein an optical connection for data transmission in the third input port is operatively coupled to a third prong of the first optical switch and an optical connection for data reception in the third input port is operatively coupled to a third prong of the second optical switch. The adapter may further comprise a third output port operatively coupled to the third input port and a fourth input port operatively coupled to the first optical switch and the second optical switch. An optical connection for data transmission in the fourth input port may be operatively coupled to a fourth prong of the first optical switch and an optical connection for data reception in the fourth input port may be operatively coupled to a fourth prong of the second optical switch. The adapter may also comprise a fourth output port operatively coupled to the fourth input port.

In some embodiments, the third output port may be operatively coupled to a leaf switch.

In some embodiments, the fourth output port may be operatively coupled to a spine switch.

In some embodiments, the adapter may further comprise a first inline optical power monitor configured to measure instantaneous power of optical signals received from the first input port of the first optical module; and a second inline optical power monitor configured to measure instantaneous power of optical signals received from the second input port of the second optical module.

In some embodiments, the adapter is further configured to detect, using the first inline optical power monitor, the operational failure of the first optical module. In response, the adapter may be configured to switch from the first configuration to the second configuration by terminating reception of the second data by the second input port of the second optical module; triggering the first data that was initially directed into the first input port of the first optical module to be directed into the second input port of the second optical module; and receiving the first data from the second output port of the second optical module.

In some embodiments, the first input port of the first optical module and the second input port of the second optical module may be operatively coupled to a dual-port Network Interface Controller (NIC).

In yet another aspect, a method of providing operational resilience using a transceiver module is presented. The method comprises receiving first data from a first optical module in a first configuration of operation and detecting, using an adapter that is operationally connected to the first optical module, an operational failure of the first optical module. In response to detecting the operational failure, the method may comprise switching, via the adapter, from the first configuration of operation to a second configuration of operation by: automatically engaging a second optical module, wherein the adapter is operationally connected to the second optical module; triggering the first data that was initially directed into a first input port of the first optical module to be directed into a second input port of the second optical module; and receiving the first data from a second output port of the second optical module.

In some embodiments, in the first configuration, the first optical module is operationally active, and the second optical module is operationally inactive.

In some embodiments, in the first configuration, the adapter may be configured to receive the first data from the first optical module and second data from the second optical module.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
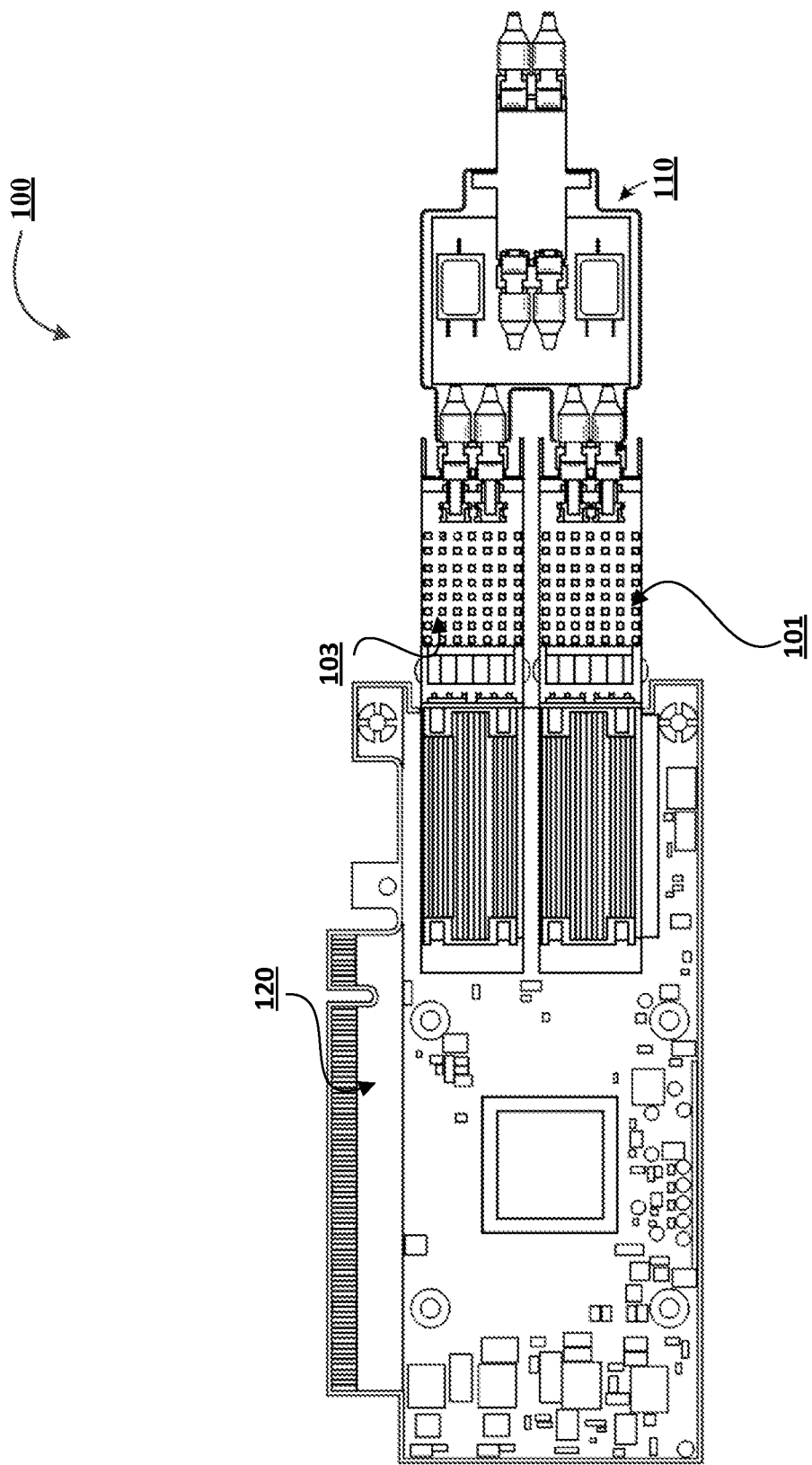
Figure 1B:
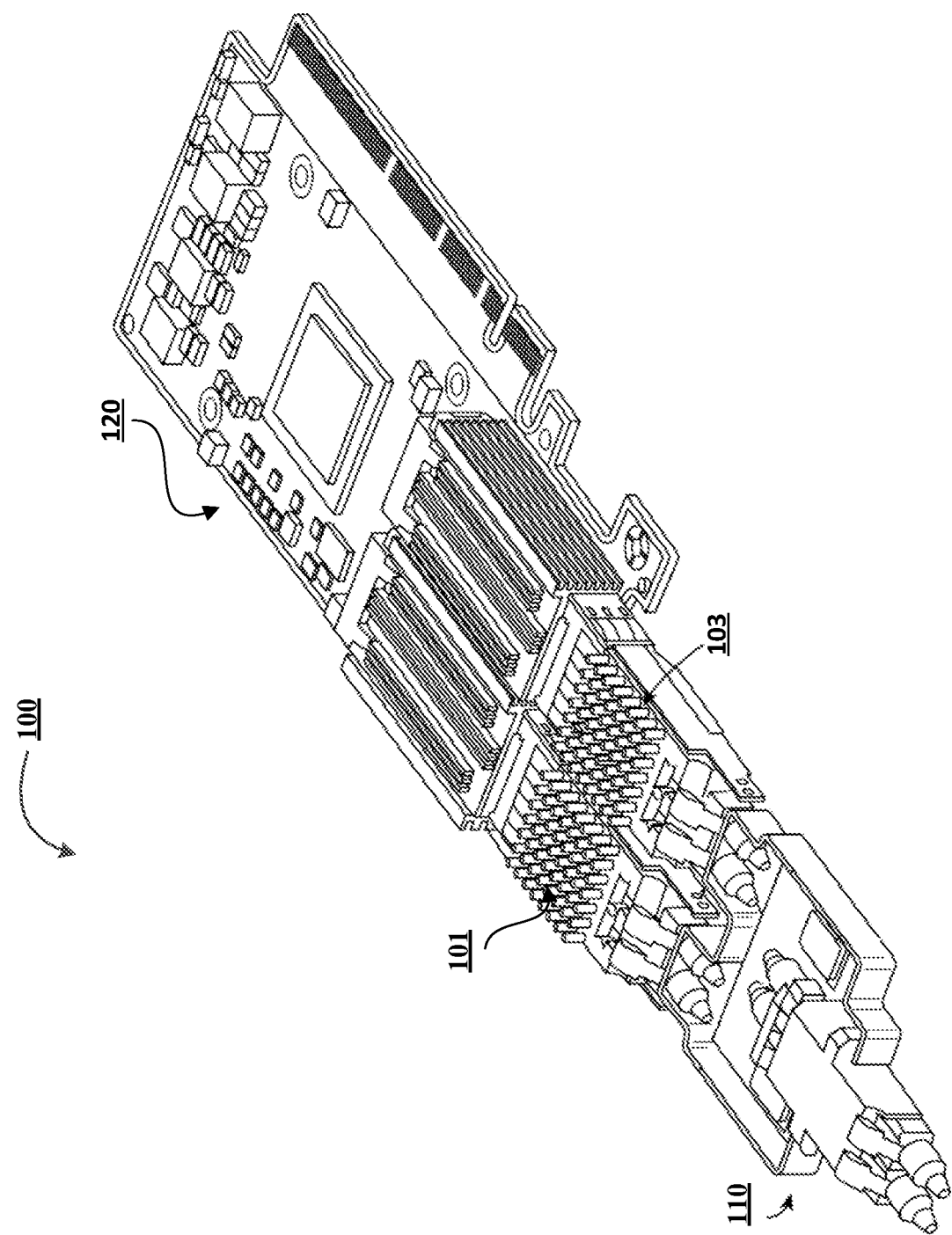
Figure 2A:
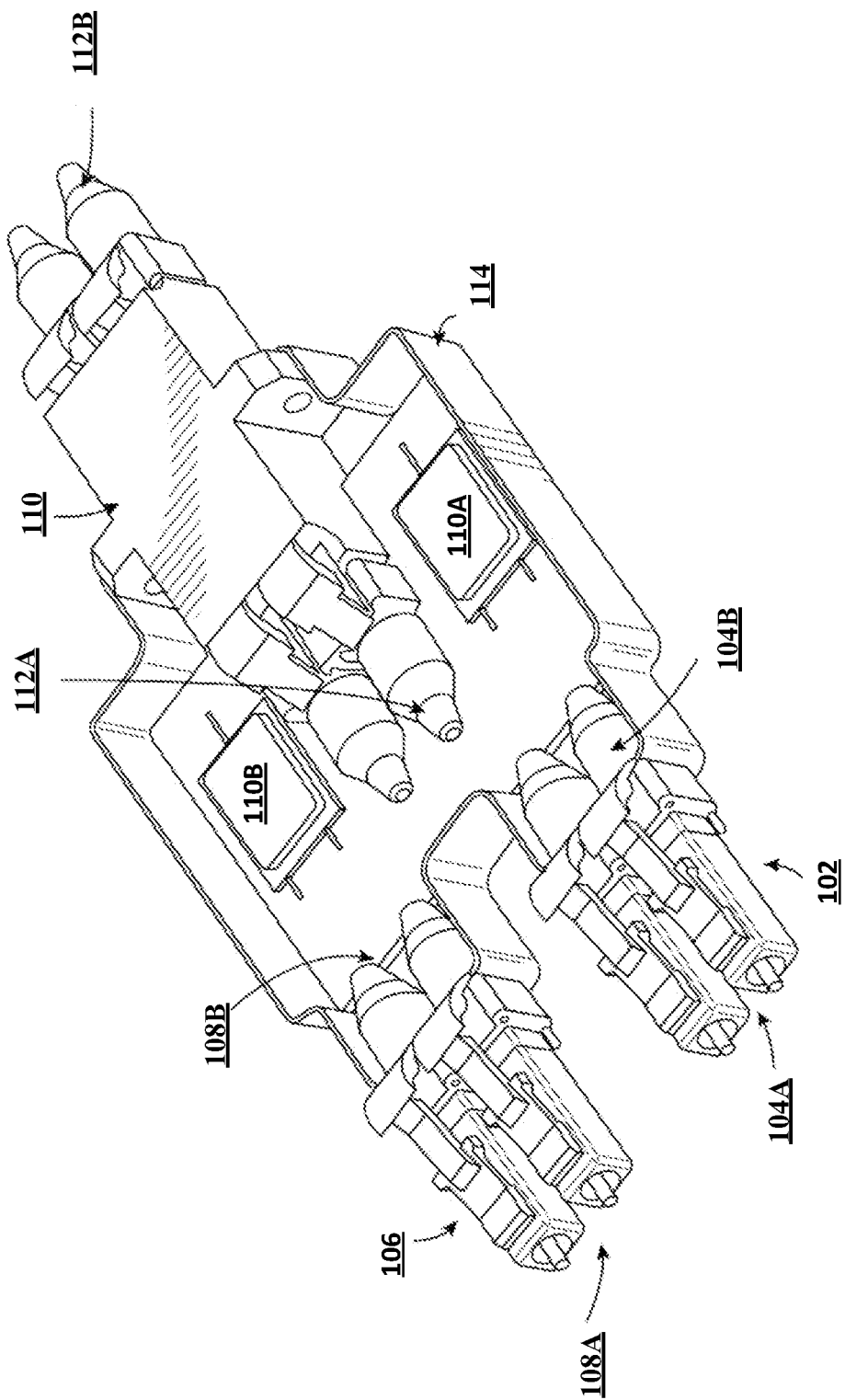
Figure 2B:
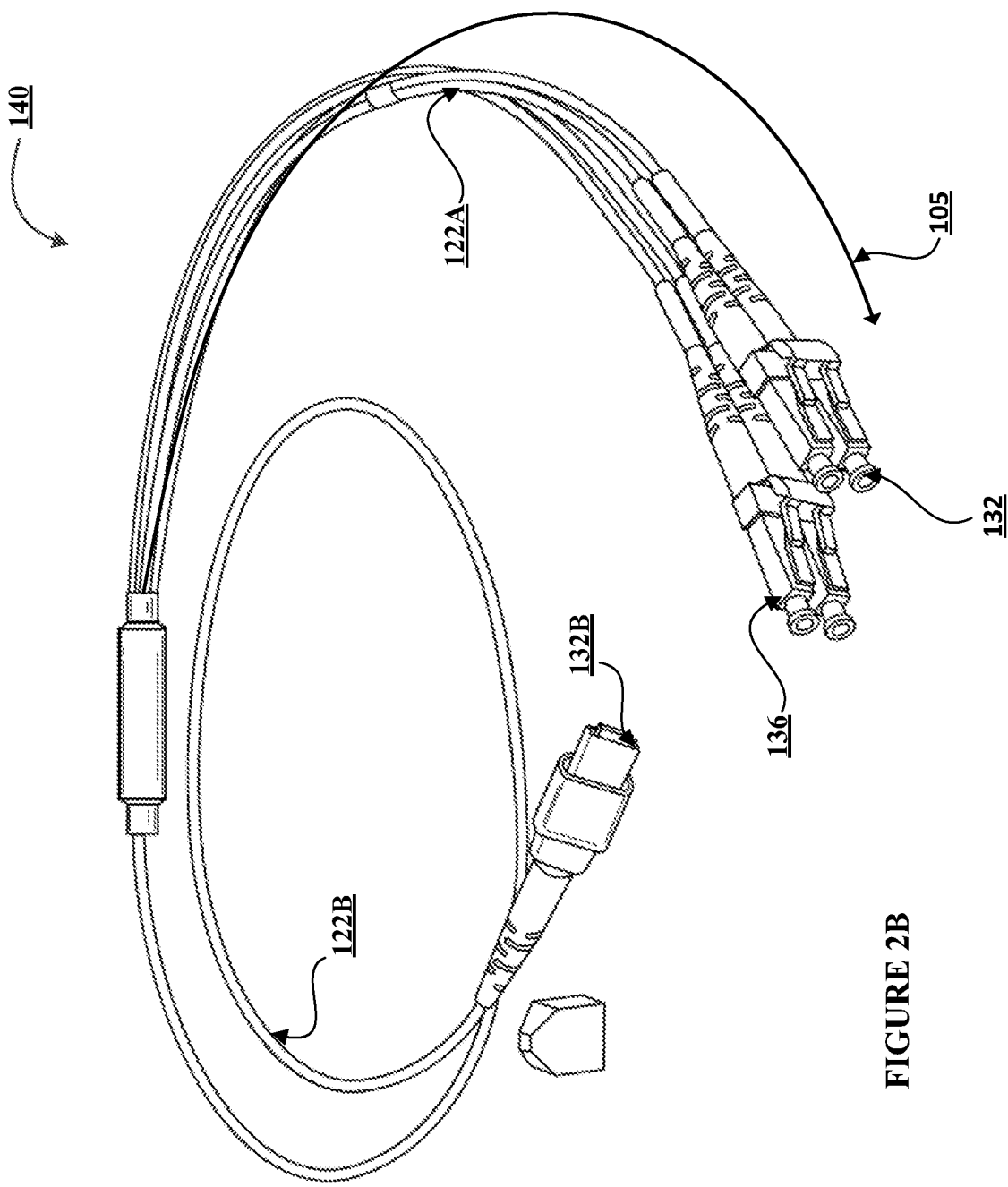
Figure 3:
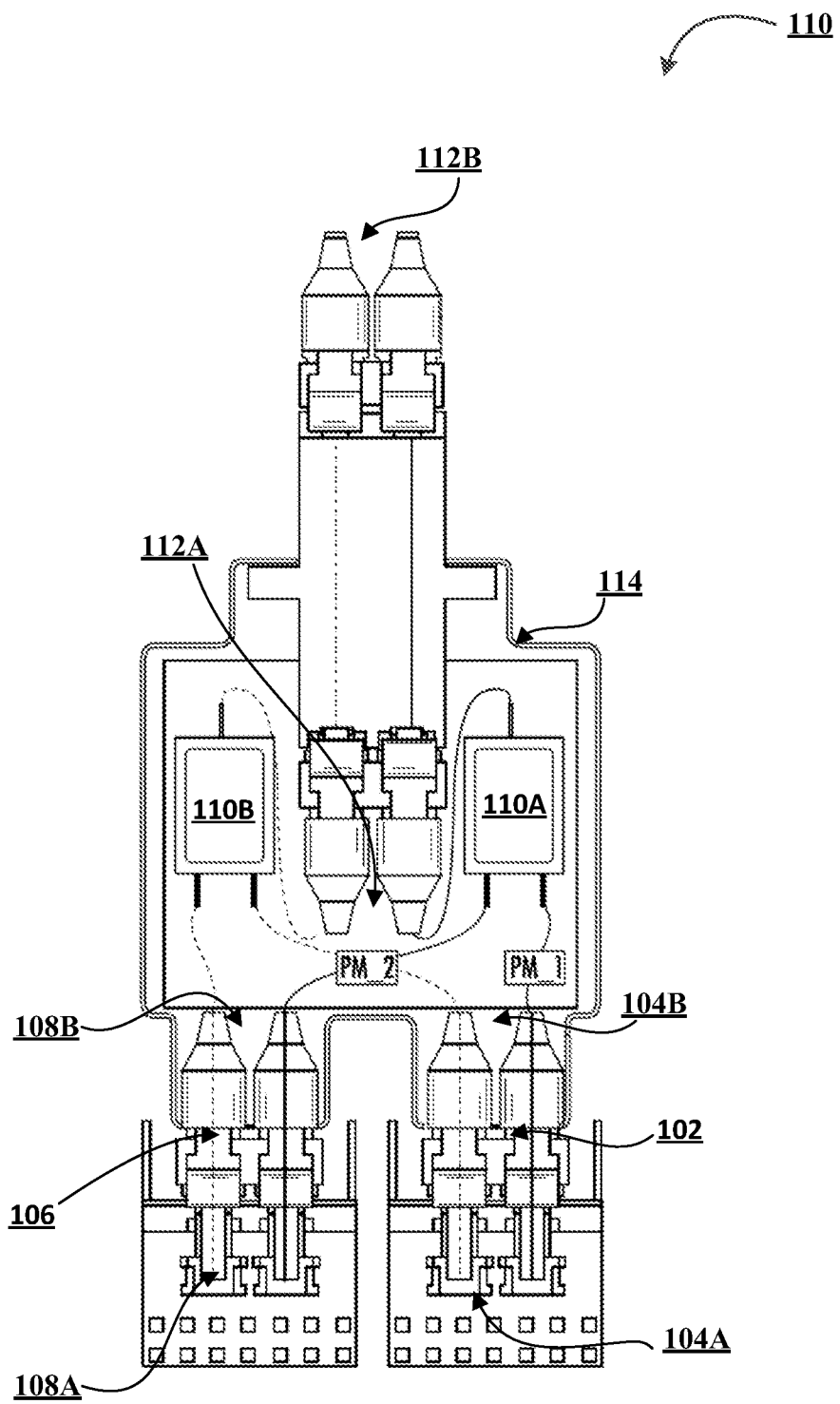
Figure 4:
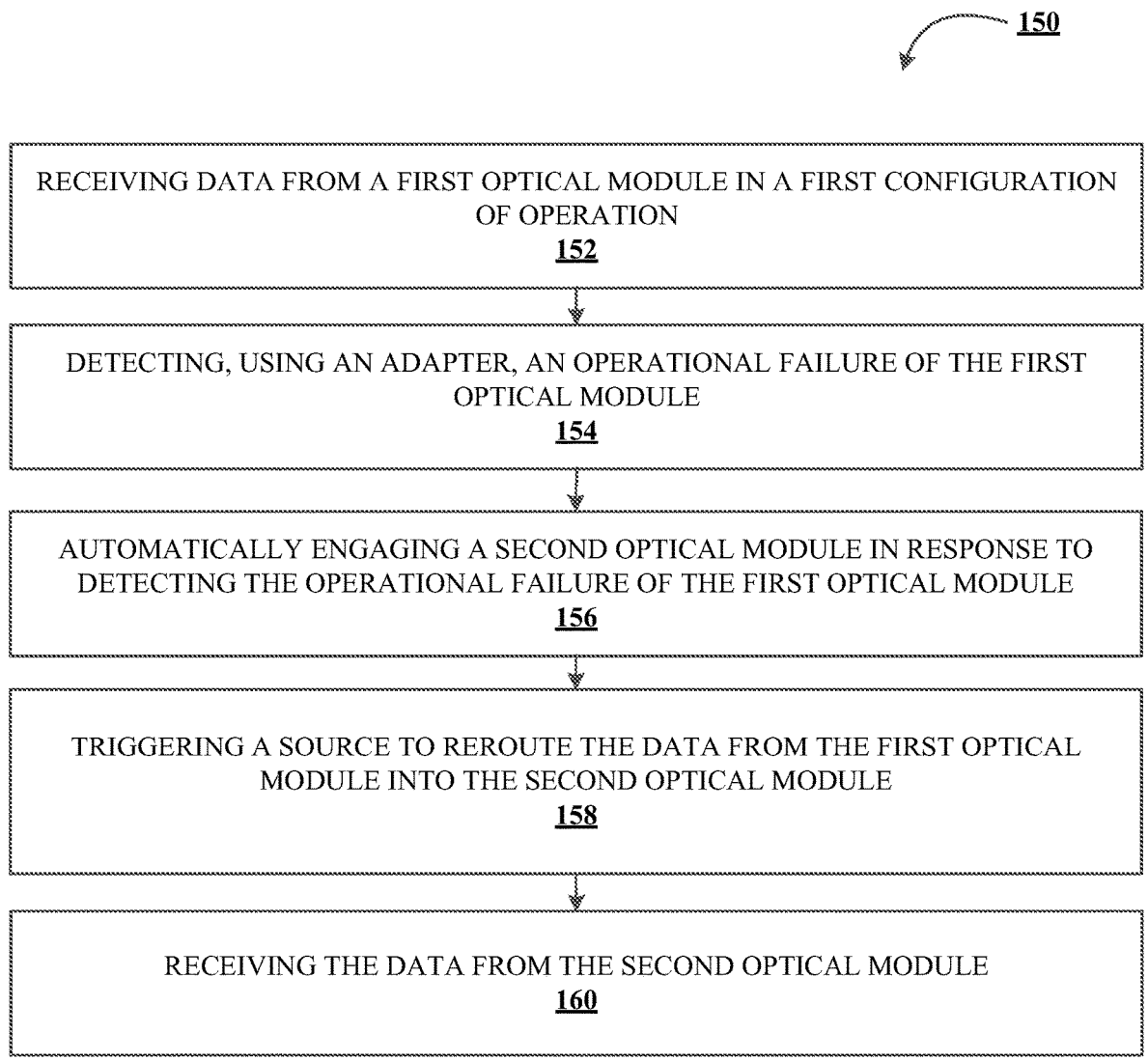
Figure 5:
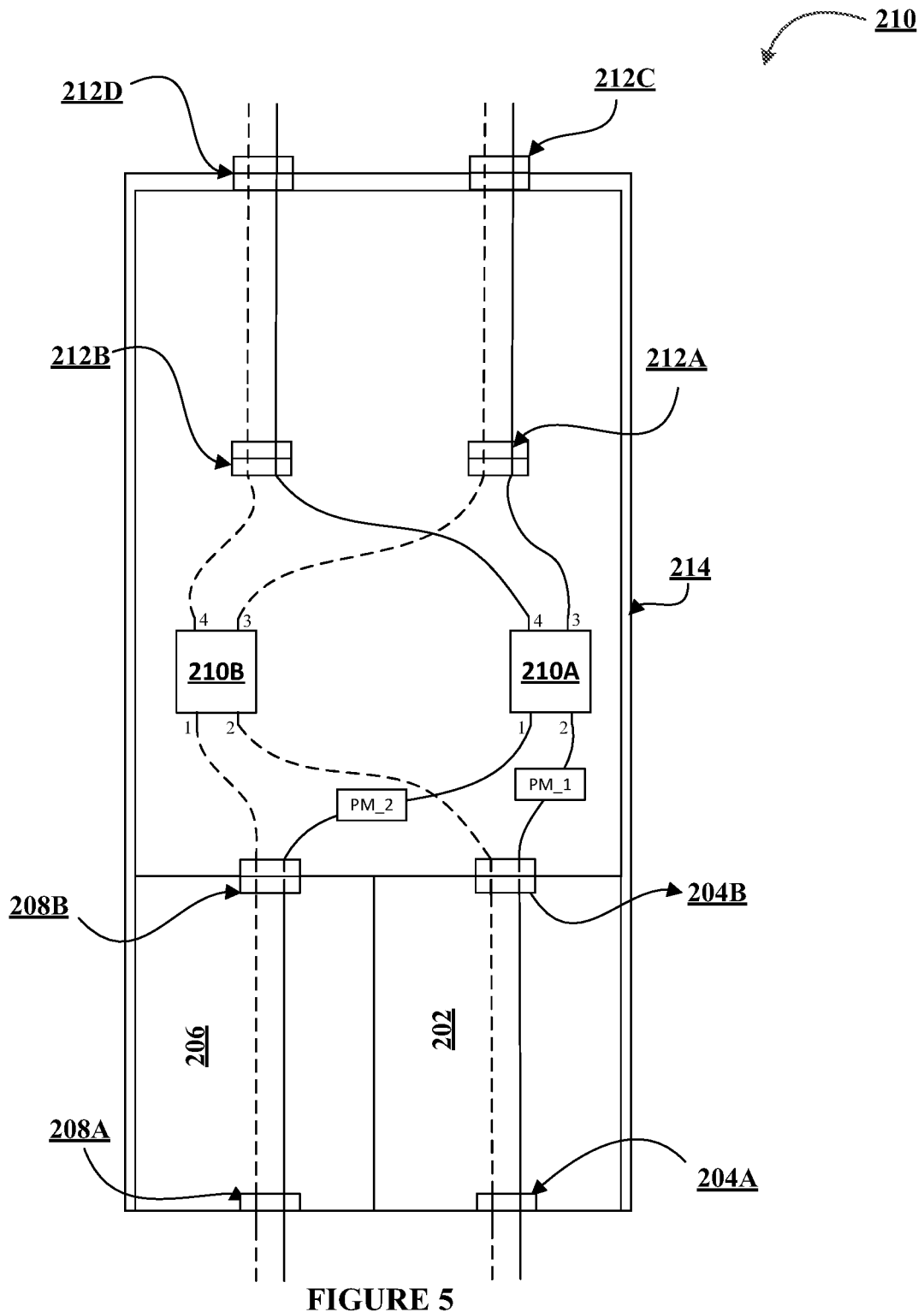
Figure 6:
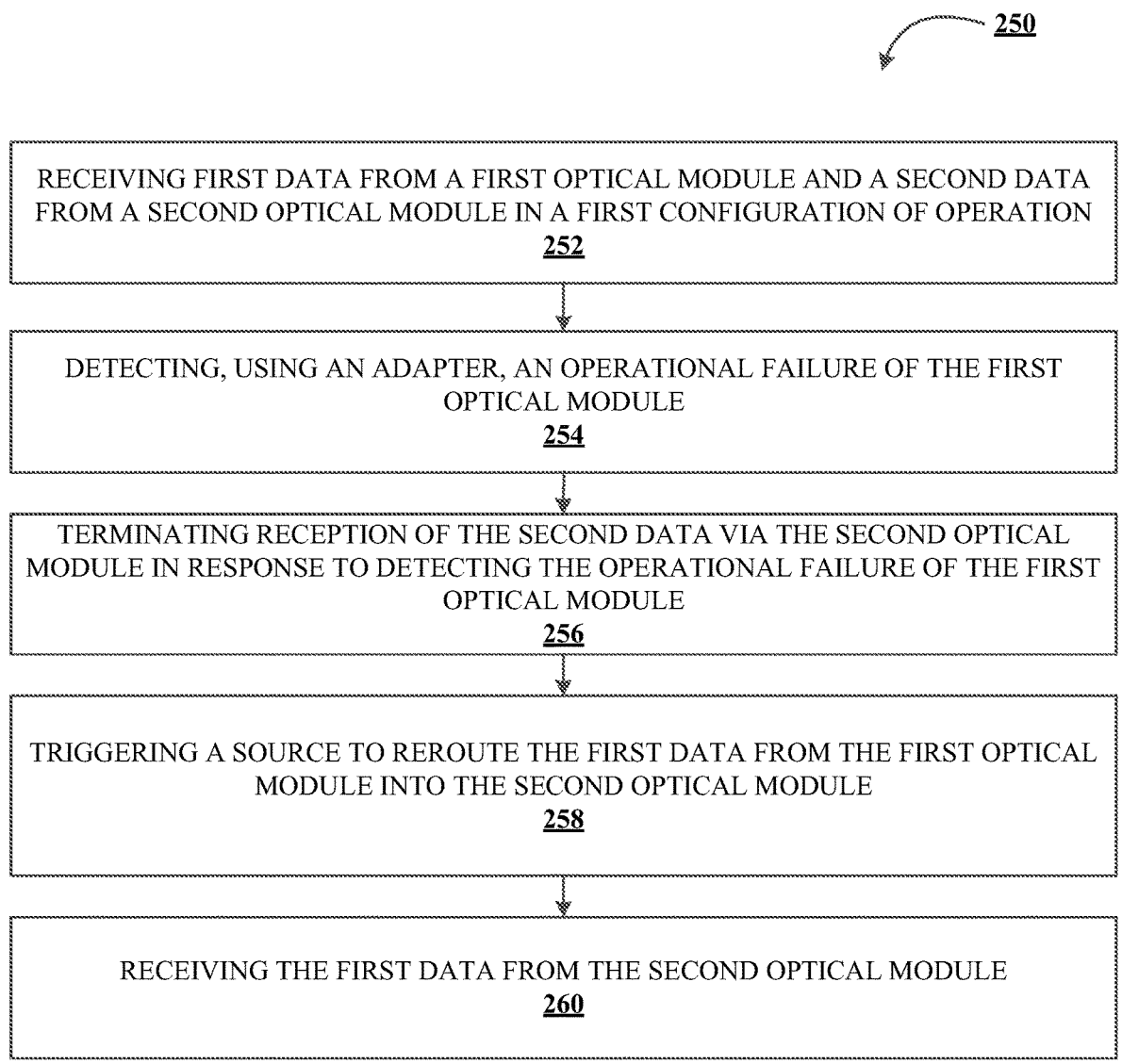

Having thus described embodiments of the invention in general terms, reference will now be made the accompanying drawings, wherein:

FIGS. 1A and 1B illustrate a top view and a perspective view, respectively, of the transceiver module operatively coupled to a Network Interface Controller (NIC), in accordance with an embodiment of the invention;

FIG. 2A illustrates a perspective view of the adapter, in accordance with an embodiment of the invention;

FIG. 2B illustrates a perspective view of the adapter, in accordance with an embodiment of the invention;

FIG. 3 illustrates internal connections between various components of the adapter, in accordance with an embodiment of the invention;

FIG. 4 illustrates a process flow for using a transceiver module for providing operational resilience, in accordance with an embodiment of the invention;

FIG. 5 illustrates a schematic representation of internal connections between various components of the adapter, in accordance with an embodiment of the invention; and FIG. 6 illustrates a process flow for using a transceiver module for providing operational resilience, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, "optical module," "fiber optic transceiver," or "optical transceiver" may refer to a hot-pluggable device used in high-bandwidth data communications applications. An optical module is an essential building block for implementing high-speed interconnects in data centers, mobile base-stations, connecting routers, base-band network equipment, and/or the like. An optical module may have a set of input ports and a set of output ports. For example, in a parallel single mode (PSM) transceiver with multiple lanes, each lane may consume a port. An optical module may have an electrical interface on one side and an optical interface on the other. Typically, the electrical interface is located on the side that connects to the source, and the optical interface is located on the side that connects to the target. An optical module may be characterized by its form factor, which specifies the physical dimensions of the transceiver (e.g., its shape and size). Some common types of form factors include Small Form Factor Pluggable (SFP), Quad Small Form Factor Pluggable (QSFP), 10 gigabit small form-factor pluggable (XFP), SFP+, QSFP+, and/or the like. It should be understood that any form factor attributed to an optical module is to be considered as a particular, non-limiting embodiment of the invention. Those of skill in the art will recognize the various form factors of an optical module described herein within the spirit and scope of the present disclosure.

As used herein, "operatively coupled" may mean that the components are electronically coupled and/or are in electrical communication with one another, or optically coupled and/or are in optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors) located between the components that are operatively coupled together. Furthermore, "operatively coupled" may mean that the components are detachable from each other or that they are permanently coupled together.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

It should be understood that the word "exemplary" is used herein to mean "serving as an example, instance, or illustration." Any implementation described herein as "exemplary" is not necessarily to be construed as advantageous over other implementations.

Optical modules are widely used in application scenarios such as data centers, base stations, Local Area Networks (LAN), backbone networks, and/or the like. As accessory products, optical modules may fail during use, causing reduced performance or unplanned downtime at the data center and resulting in significant cost to the user. To address this issue, the present invention introduces a transceiver module comprising a first optical module, a second optical module, and an adapter. Should an active optical module fail during operations, the adapter may be configured to detect this failure and redirect traffic from a failing/failed optical module into its paired counterpart for continued performance.

In some embodiments, one optical module is operationally active while the other remains operationally inactive or idle. Both the optical modules are connected to a pair of 1×2 optical switches housed within the adapter, with one optical switch handling data transmission and the other handling data reception. During operation, the active optical module handles incoming and outgoing traffic to and from the source (e.g., server). Should the active optical module fail, the adapter detects this failure and, in response, (i) activates the operationally inactive optical module, and (ii) triggers the source to redirect traffic into the second optical module. The now active optical module takes over and handles incoming and outgoing traffic to and from the server, providing continued performance.

FIGS. 1A and 1B illustrate a top view and a perspective view, respectively, of the transceiver module operatively coupled to a Network Interface Controller (NIC) 100, in accordance with an embodiment of the invention. As shown in FIGS. 1A and 1B, the transceiver module may include a first optical module 101, a second optical module 103, an adapter 110, and a dual-port NIC 120 of a server. Both the first optical module 101 and the second optical module 103 may be dual-fiber transceivers that are configured for duplex communication that allows the source (e.g., server) to communicate with the target (e.g., leaf switch) in both directions. The adapter 110 may be a ganged physical component configured to link the first optical module 101 and the second optical module 103 for the purpose of transmitting and receiving data to and from the leaf switch.

In some embodiments, the adapter 110 may be configured to operate in two configurations, such as a first configuration and a second configuration. In one aspect, the first configuration may be a default configuration of operation, where the first optical module 101 may be operationally active. The second configuration may be a contingent configuration that is implemented when the first optical module 101 operationally fails. When such a failure is detected, the second optical module 103, which is otherwise operationally inactive or idle, may be engaged become operationally active and handle all network traffic that was initially handled by the first optical module 101.

In some embodiments, the transceiver module 100 may be configured to operate in a leaf-spine architecture. A leaf-spine architecture is a data center network topology that may include two switching layers—a spine layer and a leaf layer. The leaf layer may include access switches (leaf switches) that aggregate traffic from servers and connect directly into the spine or network core. Spine switches interconnect all leaf switches in a full-mesh topology between access switches in the leaf layer and the servers from which the access switches aggregate traffic. As such, in one embodiment, to ensure reliable operation of downlinks, the transceiver module 100 may be configured to operate between the server and the leaf layer. In particular, as shown in FIGS. 1A and 1B, the adapter 110 may be operatively coupled to the first optical module 101 and the second optical module 103, while the first optical module 101 and the second optical module 103 may be operatively coupled to a dual-port NIC 120 of a server.

FIG. 2A illustrates a perspective view of the adapter 110, in accordance with an embodiment of the invention. As shown in FIG. 2A, the adapter 110 may be encapsulated at least partially by a housing 114 in a single assembly, allowing for the reduced overall size. The adapter 110 may include a first optical coupler 102 that may be operatively coupled to the first optical module 101, and a second optical coupler 106 that may be operatively coupled to the second optical module 103. Also, the adapter 110 may include a first optical switch 110A and a second optical switch 110B. The first optical switch 110A may be configured to be used in conjunction with optical connections for data transmission and the second optical switch 110B may be configured to be used in conjunction with optical connections for data reception. The first optical switch 110A and the second optical switch 110B may be configured to selectively route the optical signals to and from the linked optical modules, i.e., the first optical module 101 and the second optical module 103.

The first optical coupler 102 may include a first input port 104A and a first output port 104B. The second optical coupler 106 may include a second input port 108A and a second output port 108B. The first input port 104A of the first optical coupler 102 may be operatively coupled to the first optical module 101, and the second input port 108A of the second optical coupler 106 may be operatively coupled to the second optical module 103. The adapter 110 may include a third input port 112A and a third output port 112B. The third input port 112A may be operatively coupled to the first optical switch 110A and the second optical switch 110B, and the third output port 112B may be operatively coupled to the leaf switch. Each port (e.g., input port, output port) of the optical module may have two optical connections configured to be used with two fiber strands, resulting in two distinct channels for the transmission and reception of data.

FIG. 2B illustrates a perspective view of the adapter 140, in accordance with an embodiment of the invention. Similar to FIG. 1A, the adapter 140 of FIG. 2B may include a first optical coupler 132 that may be operatively coupled to the first optical module 101, and a second optical coupler 136 that may be operatively coupled to the second optical module 103. However, while the embodiment of the adapter 110 in FIG. 1A has the adapter encapsulated by a housing, the adapter 140 according to the embodiment of FIG. 2B may be physically separated from the first optical coupler 132 and the second optical coupler 136. Instead, the adapter 140 may be operatively coupled to the first optical coupler 132 and the second optical coupler 136 using optical fibers 122A housing two fiber strands, thereby resulting in two distinct channels for the transmission and reception of data. The adapter 140 may be operatively coupled to a third output port 132B using an optical fiber 122B. The third output port 112B, in turn, may be configured to be operatively coupled to the leaf switch. The adapter 140 may also include a dedicated electrical connection 105 to the server that may be configured to transmit control signals and to deliver electrical power thereto.

FIG. 3 illustrates internal connections between various components of the adapter 110, in accordance with an embodiment of the invention. As described herein, the first input port 104A, the first output port 104B, the second input port 108A, and the second output port 108B may each have two optical connections configured to be used with two fiber strands, resulting in two distinct channels of transmission and reception of data. As described herein, the first optical switch 110A may be configured to be used in conjunction with optical connections for data transmission. Accordingly, the first prong of the first optical switch 110A may be operatively coupled to the optical connection for data transmission of the first optical coupler 102 and the second prong of the first optical switch 110A may be operatively coupled to the optical connection for data transmission of the second optical coupler 106, as shown in solid lines in FIG. 3. As described herein, the second optical switch 110B may be configured to be used in conjunction with optical connections for data reception. Accordingly, the first prong of the second optical switch 110B may be operatively coupled to the optical connection for data reception of the first optical coupler 102 and the second prong of the second optical switch 110B may be operatively coupled to the optical connection for data reception of the second optical coupler 106, as shown in dotted lines in FIG. 3.

The third input port 112A may be operatively coupled to the first optical switch 110A and the second optical switch 110B. Similar to the ports in first optical coupler 102 and the second optical coupler 106, the third input port 112A and the third output port 112B of the adapter 110 may each have two optical connections, resulting in two distinct channels of transmission and reception of data. The optical connection for data transmission in the third input port 112A may be operatively coupled to the third prong of the first optical switch 110A, and the optical connection for data reception in the third input port 112A may be operatively coupled to the third prong in the second optical switch 110B, as shown in FIG. 3. The third input port 112A may be operatively coupled to the third output port 112B and is configured receive data from the third input port 112A for transmission and reception of data to and from the target (e.g., leaf switch).

The adapter 110 may also include a first inline optical power monitor PM_1 and a second inline optical power monitor PM_2, as shown in FIG. 3. PM_1 and PM_2 are adapted to measure the inline optical power travelling through an optical communication medium (fiber) between two points. In particular, PM_1 is adapted to measure the inline optical power between the first output port 104B and the first optical switch 110A, and PM_2 is adapted to measure the inline optical power between the second output port 108B and the second optical switch 110B. In particular PM_1 is adapted to measure the in line optical power flowing across the optical connection between the first prong of the first optical switch 110A and the optical connection for data transmission in the first output port 104B. Similarly, PM_2 is adapted to measure the inline optical power flowing across the optical connection between the first prong of the second optical switch 110B and the optical connection for data transmission in the second output port 108B.

In some embodiments, the adapter 110 may also include a power distribution element (not shown) operatively coupled to the first optical switch 110A, the second optical switch 110B, PM_1, and PM_2.

FIG. 4 illustrates a process flow for using a transceiver module for providing operational resilience 150, in accordance with an embodiment of the invention. As shown in block 152, the process flow includes receiving data from a first optical module 101 in a first configuration of operation.

In the first configuration, when data is transmitted from the server to the leaf switch, the first optical module 101 may be configured to receive data in the form of electrical signals from the server. These electrical signals are then converted into optical signals and transmitted. These optical signals are then received by the adapter 110 via the first optical coupler 102. The data is then received by the first optical switch 110A of the adapter 110, and subsequently routed to third input port 112A. The third output port 112B of the adapter 110 may receive the data from the third input port 112A and subsequently transmit the data to the leaf switch. When data is received from the leaf switch, the adapter 110 may be configured to receive the data in the form of optical signals from the leaf switch via the third output port 112B. The second optical switch 110B of the adapter may receive the data (via the third input port 112A) and route it to the first optical module 101 via the first optical coupler 102. These optical signals are then converted into electrical signals by the first optical module 101, and subsequently transmitted to the server. In the first configuration, the second optical module 103 may remain operationally inactive, such that the transmission and reception of data is handled by the first optical module 101.

Next, as shown in block 154, the process flow includes detecting, using an adapter 110, an operational failure of the first optical module 101. As described herein, it is not uncommon for an optical module to fail during operation due to a number of reasons, causing reduced performance or unplanned downtime at the data center and resulting in significant cost to the user. During operation, the inline optical power monitors PM_1 and PM_2 continuously monitor the first optical module 101 and the second optical module 103 to determine whether they are operational. The first optical module 101 is considered operational if PM_1 is able to detect the instantaneous power of the optical signals flowing through the optical fiber connecting the first output port 104B of the first optical coupler 102 and the first optical switch 110A. Similarly, the second optical module 103 is considered operational if PM_2 is able to detect the instantaneous power of the optical signals flowing through the optical fiber connecting the second output port 108B of the second optical coupler 106 and the first optical switch 110A. At any point in time, if PM_1 stops detecting the power, the first optical module 101 may be considered to be in operational failure.

Next, as shown in block 156, the process flow includes automatically engaging the second optical module 103 in response to detecting the operational failure of the first optical module 101. In some embodiments, in response to detecting the operational failure of the first optical module 101, the adapter 110 may be configured to trigger the transceiver module 100 to switch from the first configuration of operation to a second, contingent configuration. In this regard, the adapter 110 may be configured to engage, e.g., trigger the second optical module 103 to become operationally active. In some embodiments, the adapter 110 may be configured to detect the operational failure of the first optical module 101 and subsequently trigger the switch to change from the first configuration to the second configuration using the power distribution element. In this regard, the power distribution element may be configured to receive an indication from PM_1 that no optical power is detected flowing through the optical fiber connecting the first output port 104B and the first optical switch 110A. In response, the power distribution element may generate control signals configured to automatically engage the second optical module 103. In some embodiments, instead of the adapter 110, the host, i.e., the dual-port NIC or the optical switch, may be configured to detect the operational failure. In response, the host may be configured to instruct the adapter 110 to switch from the first configuration of operation to a second, contingent configuration. To this end, the optical switches 110A and 110B in the adapter 110 may receive instructions from the dual-port NIC to trigger the switch in configuration.

Next, as shown in block 158, the process flow includes triggering a source to reroute the data from the first optical module 101 into the second optical module 103. In some embodiments, in addition to engaging the second optical module 103, the power distribution element may also be configured to transmit control signals configured to trigger the source to reroute the data.

Next, as shown in block 160, the process flow includes receiving the data from the second optical module. Once operationally active, similar to the first optical module 101, the second optical module 103 may be configured to receive data in the form of electrical signals from the server. These electrical signals are then converted into optical signals and transmitted. These optical signals are then received by the adapter 110 via the second optical coupler 106. The data is then received by the first optical switch 110A of the adapter 110, and subsequently routed to third input port 112A. The third output port 112B of the adapter 110 may receive the data from the third input port 112A and subsequently transmit the data to the leaf switch. When data is received from the leaf switch, the adapter 110 may be configured to receive the data in the form of optical signals from the leaf switch via the third output port 112B. The second optical switch 110B of the adapter may receive the data (via the third input port 112A) and route it to the second optical module 103 via the second optical coupler 106. These optical signals are then converted into electrical signals by the second optical module 103 and transmitted to the server. Thus, in the second configuration, the second optical module 103 may be operationally active, such that all network traffic from the sever is handled by the second optical module 103 instead of the first optical module 101 and transmitted to the leaf switch via the adapter 110.

In some cases, there may not always be sufficient pluggable space on the server to host an operationally inactive optical module waiting to be used only in a contingent scenario. To ensure that no optical module remains unused for any amount of time, in some embodiments, the transceiver module 100 may include two optical modules where both optical modules are operationally active. Both the optical modules are connected to a pair of 2×2 optical switches housed within the adapter. During normal operation, one optical module handles leaf layer traffic, i.e., traffic from the leaf switch to a server, while the other optical module handles spine layer traffic, i.e., traffic from the leaf switch to the spine switch. Should the optical module handling leaf layer traffic fail, the adapter detects this failure. In response, the adapter stops existing traffic received via the second optical module and triggers the source to redirect the traffic initially received via the first optical module so that it is instead received via the second optical module, thereby prioritizing the more important of the two connections.

FIG. 5 illustrates a schematic representation of internal connections between various components of the adapter 210, in accordance with an embodiment of the invention. As shown in FIG. 5, the adapter 110 may be encapsulated at least partially by a housing 114 in a single assembly, allowing for the reduced overall size. Similar to the adapter 110 in FIG. 2A, the adapter 210 may include a first optical coupler 202 that may be operatively coupled to the first optical module 101, and a second optical coupler 206 that may be operatively coupled to the second optical module 103. Also, the adapter 110 may include a first optical switch 210A and a second optical switch 210B. The first optical switch 210A may be configured to be used in conjunction with optical connections for data transmission and the second optical switch 210B may be configured to be used in conjunction with optical connections for data reception. The first optical switch 210A and the second optical switch 210B may be configured to selectively route the optical signals to and from the linked optical modules, i.e., the first optical module 101 and the second optical module 103.

The first optical coupler 202 may include a first input port 204A and a first output port 204B. The second optical coupler 206 may include a second input port 208A and a second output port 208B. The first input port 204A of the first optical coupler 202 may be operatively coupled to the first optical module 101, and the second input port 208A of the second optical coupler 206 may be operatively coupled to the second optical module 103. The adapter 210 may also include a third input port 212A, a fourth input port 212 that may be operatively coupled to the first optical switch 210A and the second optical switch 210B, and a third output port 212C, and a fourth output port 212D that may be operatively coupled to a leaf switch and a spine switch, respectively. Each port (e.g., input port, output port) of the optical module may have two optical connections configured to be used with two fiber strands, resulting in two distinct channels for the transmission and reception of data.

In some embodiments, the adapter 210 may be configured to operate in two configurations, such as a first configuration and a second configuration. In both configurations, the first optical module 101 and the second optical module 103 may be operationally active. The first configuration may be a default configuration of operation, and the second configuration may be a contingent configuration that is implemented when the first optical module 101 operationally fails. When such a failure is detected, existing traffic received via the second optical module is terminated and the source is triggered to redirect the traffic initially received via the first optical module so that it is instead received via the second optical module, thereby prioritizing the more important of the two connections.

Similar to the transceiver module 100 shown in FIGS. 1A and 1B, the transceiver module implementing the adapter 210 may be configured to operate in a leaf-spine architecture. However, unlike the transceiver module 100, the transceiver module implementing the adapter 210 may be configured to operate between both the server and the leaf layer, and the leaf and spine layer. In particular, the adapter 210 may be operatively coupled to the first optical module 101 and the second optical module 103, while the first optical module 101 and the second optical module 103 may be operatively coupled to two ports of a leaf switch. The third output port 212C of the adapter 210 may be operatively coupled to a server NIC and the fourth output port 212D of the adapter 210 may be operatively coupled to a spine switch in the spine layer.

The first optical switch 210A may be configured to be used in conjunction with optical connections for data transmission. Accordingly, the first prong of the first optical switch 210A may be operatively coupled to the optical connection for data transmission of the first optical module 101 and the second prong of the first optical switch 210A may be operatively coupled to the optical connection for data transmission of the second optical coupler 206, as shown in solid lines in FIG. 5. The second optical switch 210B may be configured to be used in conjunction with optical connections for data reception. Accordingly, the first prong of the second optical switch 210B may be operatively coupled to the optical connection for data reception of the first optical module 101 and the second prong of the second optical switch 210B may be operatively coupled to the optical connection for data reception of the second optical coupler 206, as shown in dotted lines in FIG. 5.

The third input port 212A may be operatively coupled to the first optical switch 210A and the second optical switch 210B. In particular, the optical connection for data transmission in the third input port 212A may be operatively coupled to the third prong of the first optical switch 210A, and the optical connection for data reception in the third input port 212A may be operatively coupled to the third prong in the second optical switch 110B, as shown in FIG. 5. Similarly, the fourth input port 212B may be operatively coupled to the first optical switch 210A and the second optical switch 210B. In particular, the optical connection for data transmission in the fourth input port 212B may be operatively coupled to the fourth prong of the first optical switch 210A, and the optical connection for data reception in the fourth input port 212B may be operatively coupled to the fourth prong in the second optical switch 210B, as shown in FIG. 5. The third output port 212C may be operatively coupled to the third input port 212A and may be configured to receive data from the third input port 212A for external transmission. Similarly, the fourth output port 212D may be operatively coupled to the fourth input port 212B and may be configured to receive data from the fourth input port 212B for external transmission.

Similar to adapter 110 of transceiver module 100, the adapter 210 of transceiver module 200 may also include a first inline optical power monitor PM_1 and a second inline optical power monitor PM_2, as shown in FIG. 5. PM_1 is adapted to measure the inline optical power between the first output port 204B and the first optical switch 210A, and PM_2 is adapted to measure the inline optical power between the second output port 208B and the second optical switch 210B. In particular, PM_1 is adapted to measure the inline optical power flowing across the optical connection between the first prong of the first optical switch 210A and the optical connection for data transmission in the first output port 204B. Similarly, PM_2 is adapted to measure the inline optical power flowing across the optical connection between the first prong of the second optical switch 210B and the optical connection for data transmission in the second output port 208B. The adapter 210 may also include a power distribution element (not shown) operatively coupled to the first optical switch 210A, the second optical switch 210B, PM_1, and PM_2.

FIG. 6 illustrates a process flow for using a transceiver module for providing operational resilience 250, in accordance with an embodiment of the invention. As shown in block 252, the process flow includes receiving first data from a first optical module 101 and second data from the second optical module 103 in a first configuration of operation. When the first data is transmitted from the server to the leaf switch, the first optical module 101 may be configured to receive the first data in the form of electrical signals from the leaf switch. These electrical signals are then converted into optical signals and transmitted. These optical signals are then received by the adapter 210 via the first optical coupler 202. The data is then received by the first optical switch 210A of the adapter 210, and subsequently routed to the third input port 212A. The third output port 212C of the adapter 210 may receive the first data from the third input port 212A and subsequently transmit the data to the server NIC. When the first data is received from the server, the adapter 210 may be configured to receive the first data in the form of optical signals from the server via the third output port 212C. The second optical switch 210B of the adapter 210 may receive the first data and route it to the first optical module 101 via the first optical coupler 202. These optical signals are then converted into electrical signals by the first optical module 101 and subsequently transmitted to the leaf switch.

Similarly, when the second data is transmitted from the leaf switch to the spine switch, the second optical module 103 may be configured to receive the second data in the form of electrical signals from the leaf switch. These electrical signals are then converted into optical signals and transmitted. These optical signals are then received by the adapter 210 via the second optical coupler 206. The data is then received by the first optical switch 210A of the adapter 210, and subsequently routed to the fourth input port 212B. The fourth output port 212D of the adapter 210 may receive the second data from the fourth input port 212B, and subsequently transmit the data to the spine switch. When second data is received from the spine switch, the adapter 210 may be configured to receive the second data in the form of optical signals from the spine switch via the fourth output port 212D. The second optical switch 210B of the adapter 210 may receive the second data and route it to the second optical module 103. These optical signals are then converted into electrical signals and subsequently transmitted to the leaf switch.

Next, as shown in block 254, the process flow includes detecting, using an adapter 210, an operational failure of the first optical module 101. The first optical module 101 is considered operational if PM_1 is able to detect the instantaneous power of the optical signals flowing through the optical fiber connecting the first output port 204B and the first optical switch 210A. Similarly, the second optical module 103 is considered operational if PM_2 is able to detect the instantaneous power of the optical signals flowing through the optical fiber connecting the second output port 208B and the first optical switch 210A. At any point in time, if PM_1 stops detecting the power, the first optical module 101 may be considered to be in operational failure.

Next, as shown in block 256, the process flow includes terminating reception of the second data via the second optical module 103 in response to detecting the operational failure of the first optical module 101. In some embodiments, in response to detecting the operational failure of the first optical module 101, the adapter may be configured to trigger the switch from the first configuration of operation to a second, contingent configuration. In this regard, the adapter may be configured to terminate reception of second data by the second input port 208A of the second optical coupler 206. In some embodiments, the adapter 210 may be configured to detect the operational failure of the first optical module 101 and subsequently trigger the switch from the first configuration to the second configuration using the power distribution element. In this regard, the power distribution element may be configured to receive an indication from PM_1 that no optical power is detected flowing through the optical fiber connecting the first output port 204B and the first optical switch 210A. In response, the power distribution element may generate control signals configured to terminate reception of the second data via the second optical module 103.

Next, as shown in block 258, the process flow includes triggering a source to reroute the first data from the first optical module 101 into the second optical module 103. In some embodiments, in addition to terminating reception of the second data via the second optical module 103, the power distribution element may also be configured to trigger the source to reroute the first data into the second optical module 103. In some other embodiments, instead of the adapter 210, the host, i.e., the dual-port NIC or the optical switch, may be configured to detect the operational failure. In response, the host may be configured to instruct the adapter 210 to switch from the first configuration of operation to a second, contingent configuration. To this end, the optical switches 210A and 210B in the adapter 210 may receive instructions from the dual-port NIC to trigger the switch in configuration.

Next, as shown in block 260, the process flow includes receiving the first data from the second optical module 103. The second optical module 103 may then be adapted to receive the first data in the form of electrical signals from the leaf switch. These electrical signals are then converted into optical signals and transmitted. These optical signals are then received by the adapter 210 via the second optical coupler 206. The data is then received by the first optical switch 210A of the adapter 110, and subsequently routed to the fourth output port 212D of the adapter 210 (via the fourth input port 212B) and subsequently to the server. When data is transmitted from the server to the leaf switch, the adapter 210 may be configured to receive the first data in the form of optical signals from the server via the fourth output port 212D. The second optical switch 210B of the adapter may receive the first data (via the fourth input port 212B) and route it to the second optical module 103 via the second optical coupler 206. These optical signals are then converted into electrical signals and transmitted to the leaf switch. By rerouting the first data to the server via the second optical module 103 in response to detecting operational failure of the first optical module 101, the more important of the two connections, the connection between the server and the leaf switch, is prioritized over the connection between the server and the spine switch.

Various implementations of the transceiver module and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, various components described herein.

It will be understood that some embodiments of the present invention are described herein with reference to flowchart illustrations and/or block diagrams. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms that implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, a computer-implemented process is thus produced, such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention is not to be limited to the specific constructions and arrangements shown and described, as various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A pluggable transceiver module, comprising:
a first optical module comprising a first input port and a first output port;
a second optical module comprising a second input port and a second output port; and
an adapter operatively coupled to the first optical module and the second optical module, wherein the adapter is a single, pluggable, add-on external ganged component disposed downstream of the first optical module and the second optical module,
wherein, in a first configuration, the first optical module is operationally active and the second optical module is operationally inactive,
wherein, in a second configuration, the second optical module is operationally active,
wherein the adapter is configured to:
detect an operational failure of the first optical module; and
switch from the first configuration to the second configuration in response to detecting the operational failure of the first optical module,
wherein the first optical module and the second optical module are small form factor pluggable (SFP) optical modules.

2. The transceiver module of claim 1, wherein the adapter comprises:
a first optical switch operatively coupled to the first optical module and the second optical module, wherein a first prong of the first optical switch is operatively coupled to an optical connection for data transmission in the first input port and a second prong of the first optical switch is operatively coupled to an optical connection for data transmission in the second input port; and
a second optical switch operatively coupled to the first optical module and the second optical module, wherein a first prong of the second optical switch is operatively coupled to an optical connection for data reception in the second input port and a second prong of the second optical switch is operatively coupled to an optical connection for data reception in the first input port.

3. The transceiver module of claim 2, wherein the adapter comprises:
a third input port operatively coupled to the first optical switch and the second optical switch, wherein a third prong of the first optical switch is operatively coupled to an optical connection for data transmission in the third input port and a third prong of the second optical switch is operatively coupled to an optical connection for data reception in the third input port; and
a third output port operatively coupled to the third input port.

4. The transceiver module of claim 3, wherein the third output port is operatively coupled to a leaf switch.

5. The transceiver module of claim 1, wherein the adapter further comprises:
a first inline optical power monitor configured to measure instantaneous power of optical signals received from the first input port of the first optical module; and
a second inline optical power monitor configured to measure instantaneous power of optical signals received from the second input port of the second optical module.

6. The transceiver module of claim 5, wherein the adapter is further configured to:
detect, using the first inline optical power monitor, the operational failure of the first optical module;
in response to detecting the operational failure of the first optical module, switch from the first configuration to the second configuration by:
triggering the second optical module to be operationally active;
triggering data that was initially directed into the first input port of the first optical module to be directed into the second input port of the second optical module; and
receiving the data from the second output port of the second optical module.

7. The transceiver module of claim 1, wherein the first input port of the first optical module and the second input port of the second optical module are operatively coupled to a dual-port Network Interface Controller (NIC).

8. The transceiver module of claim 1, further comprising a housing encapsulating the first optical module, the second optical module, and the adapter.

9. A transceiver module, comprising:
a first optical module comprising a first input port and a first output port;
a second optical module comprising a second input port and a second output port; and
an adapter operatively coupled to the first optical module and the second optical module,
wherein, in a first configuration, the first optical module and the second optical module are active, and the adapter is configured to receive first data from the first optical module and second data from the second optical module,
wherein in a second configuration, the adapter is configured to receive the first data from the second optical module,
wherein the adapter is configured to:
detect an operational failure of the first optical module;
terminate reception of the second data from the second optical module in response to detection of the operational failure; and
switch from the first configuration to the second configuration in response to detecting the operational failure of the first optical module,
wherein the first optical module and the second optical module are pluggable optical modules.

10. The transceiver module of claim 9, wherein the adapter comprises:
a first optical switch operatively coupled to the first optical module and the second optical module, wherein a first prong of the first optical switch is operatively coupled to an optical connection for data transmission in the first input port and a second prong of the first optical switch is operatively coupled to an optical connection for data transmission in the second input port; and a second optical switch operatively coupled to the first optical module and the second optical module, wherein a first prong of the second optical switch is operatively coupled to an optical connection for data reception in the second input port and a second prong of the second optical switch is operatively coupled to an optical connection for data reception in the first input port.

11. The transceiver module of claim 10, wherein the adapter comprises:

a third input port operatively coupled to the first optical switch and the second optical switch, wherein an optical connection for data transmission in the third input port is operatively coupled to a third prong of the first optical switch and an optical connection for data reception in the third input port is operatively coupled to a third prong of the second optical switch;

a third output port operatively coupled to the third input port;

a fourth input port operatively coupled to the first optical switch and the second optical switch, wherein an optical connection for data transmission in the fourth input port is operatively coupled to a fourth prong of the first optical switch and an optical connection for data reception in the fourth input port is operatively coupled to a fourth prong of the second optical switch; and a fourth output port operatively coupled to the fourth input port.

12. The transceiver module of claim 11, wherein the third output port is operatively coupled to a server.

13. The transceiver module of claim 10, wherein fourth output port is operatively coupled to a spine switch.

14. The transceiver module of claim 9, wherein the adapter further comprises:

a first inline optical power monitor configured to measure instantaneous power of optical signals received from the first input port of the first optical module; and a second inline optical power monitor configured to measure instantaneous power of optical signals received from the second input port of the second optical module.

15. The transceiver module of claim 14, wherein the adapter is further configured to:

detect, using the first inline optical power monitor, the operational failure of the first optical module;

in response, switch from the first configuration to the second configuration by:

terminating reception of the second data by the second input port of the second optical module;

triggering the first data that was initially directed into the first input port of the first optical module to be directed into the second input port of the second optical module; and receiving the first data from the second output port of the second optical module.

16. The transceiver module of claim 9, wherein the first input port of the first optical module and the second input port of the second optical module are operatively coupled to two ports of a leaf switch.

17. The transceiver module of claim 9, further comprising a housing encapsulating the first optical module, the second optical module, and the adapter.

18. A method of providing operational resilience using a pluggable transceiver module, the method comprising:

receiving first data from a first optical module in a first configuration of operation;

detecting, using an adapter that is operationally connected to the first optical module, an operational failure of the first optical module;

in response to detecting the operational failure, switching, using the adapter, from the first configuration of operation to a second configuration of operation by:

automatically engaging a second optical module, wherein the adapter is operationally connected to the second optical module; and triggering the first data that was initially directed into a first input port of the first optical module to be directed-into a second input port of the second optical module; and receiving the first data from a second output port of the second optical module, wherein the first optical module and the second optical module are pluggable optical modules, and wherein the adapter is a single, pluggable, add-on external ganged component disposed downstream of the first optical module and the second optical module.

19. The method of claim 18, wherein, in the first configuration, the first optical module is operationally active, and the second optical module is operationally inactive.

20. The method of claim 18, wherein, in the first configuration, the adapter is configured to receive the first data from the first optical module and second data from the second optical module.

21. The transceiver module of claim 9, wherein the first optical module and the second optical module are small form factor pluggable (SFP) optical modules.

22. The method of claim 18, wherein the first optical module and the second optical module are small form factor pluggable (SFP) optical modules.

* * * * *